US011440657B2

(12) United States Patent
Schwindt

(10) Patent No.: US 11,440,657 B2
(45) Date of Patent: Sep. 13, 2022

(54) AERIAL VEHICLES WITH MACHINE VISION

(71) Applicant: GE AVIATION SYSTEMS LIMITED, Cheltenham (GB)

(72) Inventor: Stefan Alexander Schwindt, Cheltenham (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 518 days.

(21) Appl. No.: 16/240,913

(22) Filed: Jan. 7, 2019

(65) Prior Publication Data
US 2019/0233101 A1    Aug. 1, 2019

(30) Foreign Application Priority Data

Jan. 29, 2018 (GB) ...................................... 1801416

(51) Int. Cl.
*B64C 39/02* (2006.01)
*G08G 5/02* (2006.01)
(Continued)

(52) U.S. Cl.
CPC ............ *B64C 39/024* (2013.01); *G06V 20/13* (2022.01); *G08G 5/0021* (2013.01);
(Continued)

(58) Field of Classification Search
CPC ............ B64C 39/024; B64C 2201/141; B64C 2201/021; G08G 5/065; G08G 5/025;
(Continued)

(56) References Cited

U.S. PATENT DOCUMENTS 6,952,632 B2    10/2005  Robert et al.
7,908,078 B2     3/2011  He
(Continued)

FOREIGN PATENT DOCUMENTS

CN    103424126 A    12/2013
CN    205594459 U     9/2016

OTHER PUBLICATIONS

Great Britain Search Report and Written Opinion dated Jun. 27, 2018 which was issued in connection with GB 1801416.7 patent number with was filed on Jan. 29, 2018.

*Primary Examiner* — James J Lee
*Assistant Examiner* — Shon G Foley
(74) *Attorney, Agent, or Firm* — Dority & Manning, P.A.

(57) ABSTRACT

An aerial vehicle is provided. The aerial vehicle can include a plurality of sensors mounted thereon, an avionics system configured to operate at least a portion of the aerial vehicle, and a machine vision controller in operative communication with the avionics system and the plurality of sensors. The machine vision controller is configured to perform a method. The method includes obtaining sensor data from at least one sensor of the plurality of sensors, determining performance data from the avionic system or an additional sensor of the plurality of sensors, processing the sensor data based on the performance data to compensate for movement of the unmanned aerial vehicle, identifying at least one geographic indicator based on processing the sensor data, and determining a geographic location of the aerial vehicle based on the at least one geographic indicator.

19 Claims, 9 Drawing Sheets

(51) Int. Cl.
*G08G 5/00* (2006.01)
*G08G 5/06* (2006.01)
*G06V 20/13* (2022.01)

(52) U.S. Cl.
CPC .......... *G08G 5/0069* (2013.01); *G08G 5/0086* (2013.01); *G08G 5/02* (2013.01); *G08G 5/025* (2013.01); *G08G 5/065* (2013.01); *B64C 2201/021* (2013.01); *B64C 2201/141* (2013.01)

(58) Field of Classification Search
CPC ...... G08G 5/0021; G08G 5/0086; G08G 5/02; G08G 5/0069; G06K 9/0063; B64D 47/08; B64D 45/04; G06T 7/70
See application file for complete search history.

(56) References Cited

U.S. PATENT DOCUMENTS

| | | |
|---|---|---|
| 8,880,328 B2 | 11/2014 | Ovens et al. |
| 8,914,166 B2 | 12/2014 | He |
| 9,443,435 B2 | 9/2016 | Baudson et al. |
| 9,643,736 B1 | 5/2017 | Ell |
| 9,772,712 B2 | 9/2017 | Kneuper et al. |
| 2009/0306840 A1* | 12/2009 | Blenkhorn ........... G05D 1/0676 701/16 |
| 2013/0138273 A1* | 5/2013 | Koukol ................ G08G 5/0065 701/15 |
| 2014/0129125 A1* | 5/2014 | Ovens .................... G08G 5/025 701/300 |
| 2017/0146990 A1 | 5/2017 | Wang et al. |
| 2017/0213465 A1* | 7/2017 | Parekh ................. G08G 5/0021 |
| 2017/0214904 A1 | 7/2017 | Wyatt et al. |
| 2018/0003505 A1 | 1/2018 | Tateishi et al. |
| 2018/0024562 A1 | 1/2018 | Bellaiche |
| 2018/0053054 A1* | 2/2018 | Schultz .................... B60R 1/00 |
| 2018/0103206 A1* | 4/2018 | Olson ................ H04N 5/23258 |
| 2018/0356841 A1* | 12/2018 | Zilberstein ............. G05D 1/104 |
| 2018/0357909 A1* | 12/2018 | Eyhorn ................ G08G 5/0091 |
| 2018/0375881 A1* | 12/2018 | Wada ..................... H04W 4/48 |

* cited by examiner

AERIAL VEHICLES WITH MACHINE VISION

FIELD

The present subject matter relates generally to aerial vehicles and, in particular, to aerial vehicles and other aircraft with machine vision.

BACKGROUND

Generally, it is useful to know a geographic location of an aircraft relative to a desired landing position or area, such as a runway, landing pad, or other suitable landing area. During flight, the position of the aircraft relative to the desired landing area aids in successfully landing the aircraft. Furthermore, understanding an approach vector during a landing attempt may further aid in safely landing the aircraft.

While aircraft generally have a plurality of instrumentation available to aid pilots and operators of the aircraft to safely maneuver the aircraft during flight, there may be limited instrumentation to aid in landing in other scenarios. There may be limited aid from instrumentation when a position is unknown, there is decreased visibility from a control position of the aircraft, and/or other issues in determining a position of an aircraft are apparent. As an example, limited visibility may result in a pilot misidentifying a runway or landing area. Furthermore, limited visibility may result in an airport runway obstruction going unnoticed by a pilot or support crew. Moreover, other conditions may result in misidentification of a landing area or landing in dangerous conditions.

Current systems require complicated radar systems, global positioning systems (GPS), and communication methodologies in an attempt to avoid these and other potential issues. Many of these systems are dependent on resources external to the aircraft and communication with the aircraft, making them subject to loss of utility if communication with a pilot is lost. Additionally, many GPS-based systems will not provide any helpful information with regards to obstructions, unsafe landing conditions, or misidentification of a runway if a general position (based on GPS) is correct.

BRIEF DESCRIPTION

Aspects and advantages of the disclosed technology will be set forth in part in the following description, or may be obvious from the description, or may be learned through practice of the disclosure.

According to one example embodiment, an aerial vehicle is provided. The aerial vehicle can include a plurality of sensors mounted thereon, an avionics system configured to operate at least a portion of the aerial vehicle, and a machine vision controller in operative communication with the avionics system and the plurality of sensors. The machine vision controller can be configured to perform a method. The method can include obtaining sensor data from at least one sensor of the plurality of sensors. The sensor data is associated with a proximal location of the aerial vehicle and the proximal location is within sensor range of the aerial vehicle. The method can also include determining performance data associated with the aerial vehicle, processing the sensor data based on the performance data to compensate for movement of the unmanned aerial vehicle, identifying at least one geographic indicator based on processing the sensor data, and determining a geographic location of the aerial vehicle based on the at least one geographic indicator.

According to another example embodiment, an unmanned aerial vehicle is provided. The unmanned aerial vehicle can include a plurality of sensors mounted thereon, an avionics system configured to operate at least a portion of the unmanned aerial vehicle, and a machine vision controller in operative communication with the avionics system and the plurality of sensors. The machine vision controller can be configured to perform a method. The method can include obtaining sensor data from at least one sensor of the plurality of sensors. The sensor data is associated with a proximal location of the unmanned aerial vehicle and the proximal location is within sensor range of the unmanned aerial vehicle. The method can also include identifying at least one geographic indicator based on processing the sensor data, determining whether the at least one geographic indicator is associated with a flight plan of the unmanned aerial vehicle, and performing an automatic maneuver of the unmanned aerial vehicle based on the determining.

According to another example embodiment, a method of locating an aerial vehicle relative to a proximal location is provided. The method can include obtaining sensor data from one or more optical sensors mounted on the aerial vehicle. The sensor data is associated with the proximal location and the proximal location is within sensor range of the aerial vehicle. The method can also include determining performance data from one or more additional sensors mounted on the aerial vehicle, processing the sensor data based on the performance data to compensate for movement of the unmanned aerial vehicle, identifying at least one geographic indicator based on processing the sensor data, and determining a geographic location of the aerial vehicle based on the at least one geographic indicator.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
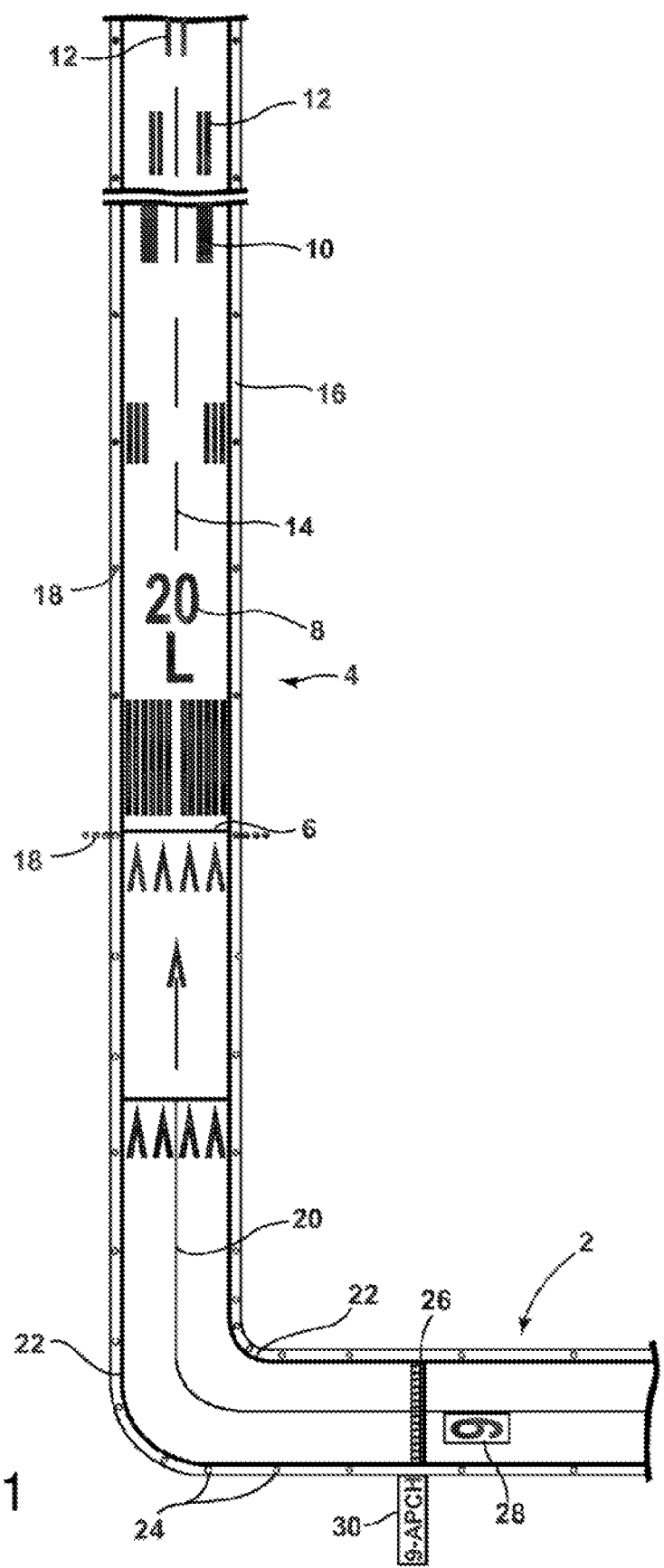
FIG. 1 is a schematic illustration of an example runway or landing area for an aerial vehicle.

Reference now will be made in detail to embodiments of the disclosed technology, one or more examples of which are illustrated in the drawings. Each example is provided by way of explanation of the disclosed technology, not limitation of the disclosed technology. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

In example aspects, a machine vision controller for an aerial vehicle or aircraft is provided. In some embodiments, the machine vision controller may execute computer-readable program instructions for: processing sensor data, identifying geographic identifiers in sensor data, comparing obtained sensor data to desired sensor data, identifying geographic location from sensor data, automatically maneuvering the aerial vehicle responsive to sensor data and other data, determining if an approach vector is safe for landing, reducing risk associated with instrumentation-only landings, and/or other program instructions. The machine vision controller may be integrated within an aerial vehicle or may be a remote controller configured to transmit calculated data to the aerial vehicle. Additionally, the machine vision controller may also be configured to provide warnings, both audial and visual, to operators of the aerial vehicle, to aid in a plurality of aircraft maneuvers. Hereinafter, a detailed description of several example embodiments of aerial vehicles and machine vision controllers are provided in detail.

Embodiments of the disclosed technology provide a number of technical benefits and advantages, particularly in the area of aircraft safety. As one example, the disclosed technology provides for safer landings by ensuring an aerial vehicle is approaching an appropriate runway or airport. The disclosed technology can also aid in automatic avoidance maneuvers through identifying geographic indicators. By identifying geographic indicators and matching geographic indicators to a map or model of an expected proximal area, the disclosed systems can avoid initiating a landing operation if an area is unexpected or if obstacles exist.

Embodiments of the disclosed technology additionally provide a number of technical benefits and advantages in the area of computing technology. For example, the disclosed system can obtain sensor data associated with performance data of an aerial vehicle and automatically determine whether performance of an aircraft is affecting a landing approach. A computing system implemented in accordance with the disclosed technology can therefore avoid costly landing maneuvers in adverse conditions or implement safer landing procedures through assuring an actual approach vector is correct for a particular aerial vehicle.

FIG. 1 is a schematic illustration of an example landing area 2 for an aerial vehicle. Generally, the landing area 2 can be aligned with a runway 4. The runway 4 may include several identifying markers painted thereon, including several indicia. For example, the runway 4 can include runway threshold markings 6, runway designation markings 8, runway aiming point markings 10, runway touchdown zone markings 12, runway centerline markings 14, runway side stripe markings 16, runway lighting 18, taxiway markings including taxiway centerline 20, taxiway edge marking 22, taxiway lighting 24, holding position markings 26, holding position sign 28, and holding position sign 30. The identifying markers and indicia may be processed by the machine vision controllers described herein, to aid in both taxying an aerial vehicle prior to takeoff and safely landing an aerial vehicle during/subsequent to a landing approach.

In some circumstances, for example during relatively poor weather or with limited visibility, an aerial vehicle may not have full visibility of some or all of the identifying markers outlined above. In these circumstances, it may be beneficial for an aerial vehicle to obtain sensor data, such as optical data, video data, photograph data, radar data, and/or Light Detection and Ranging (LIDAR) data. The sensor data can subsequently be processed to determine if an aerial vehicle can safely land or if an avoidance maneuver is appropriate. Additionally, under some circumstances, the sensor data can be compared to a map or model of a proximal area near the aircraft. Upon comparing, geographic indicators including buildings, landmarks, topographical features, runways, runway markings, and other geographic indicators can be identified to determine that the aerial vehicle is operating or attempting to land in a safe or expected area. Hereinafter, scenarios involving an aerial vehicle approaching the runway 4 are described in detail with reference to FIG. 2A, FIG. 2B, FIG. 3A, and FIG. 3B.

Figure 2A:
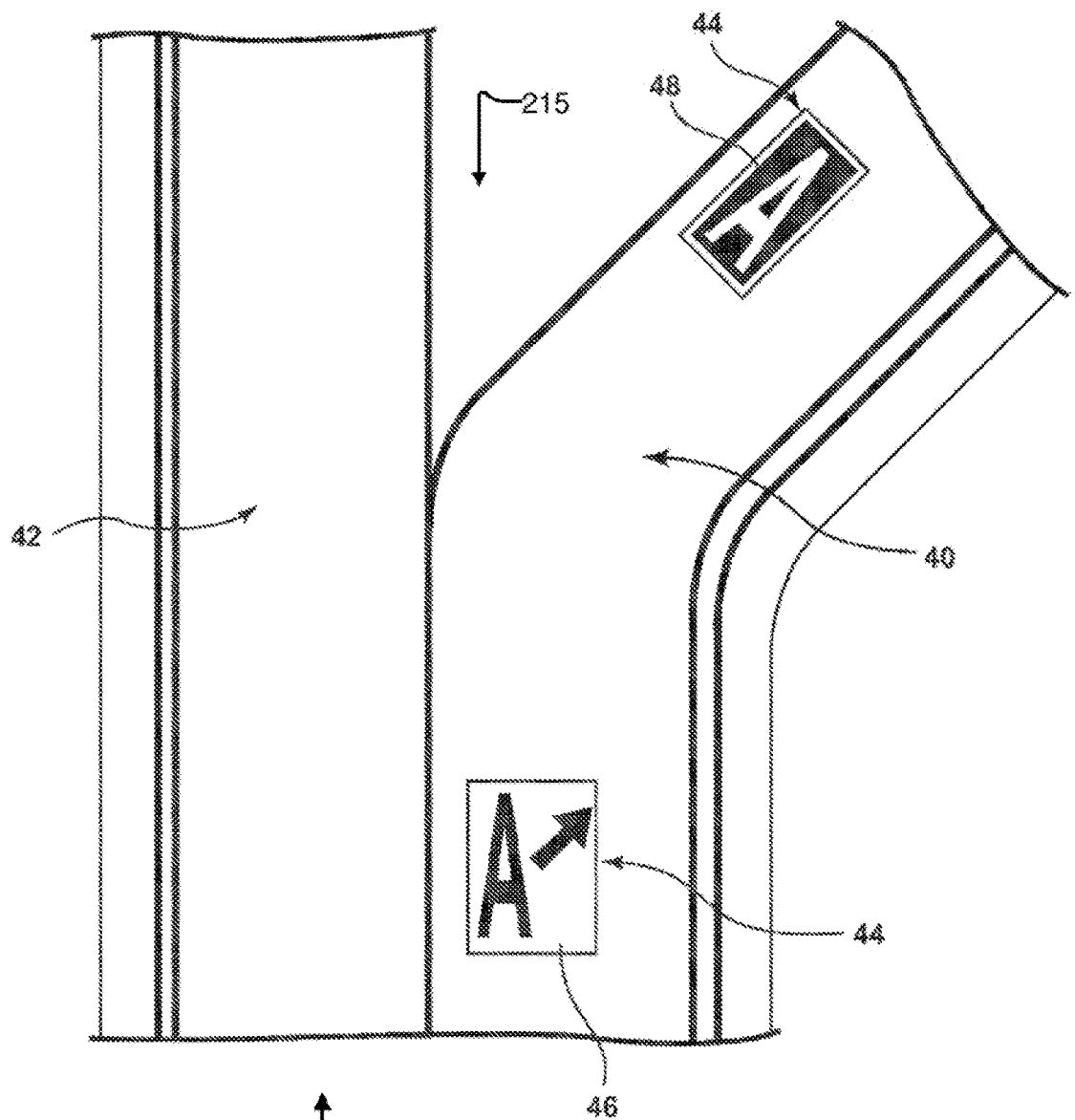
FIG. 2A is a schematic illustration of an aerial vehicle approaching a portion of the landing area of FIG. 1.
Figure 2A:
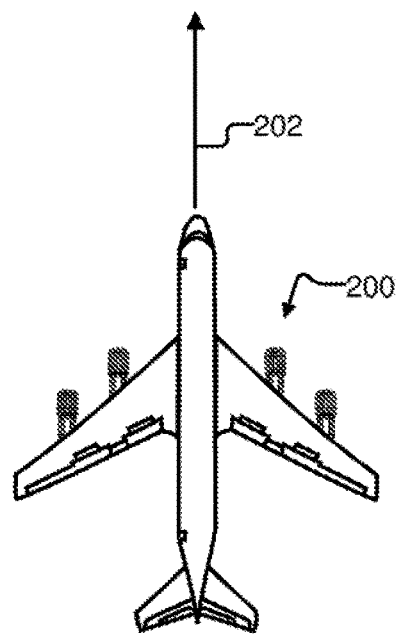

FIG. 2A is a schematic illustration of an aerial vehicle 200 approaching a portion 215 of the landing area of FIG. 1. For example, taxiway 40 and taxiway 42 with geographic position markings 44 including a direction sign 46 and a location sign 48 are presented on the portion 215. Furthermore, the aerial vehicle 200 is approaching the portion 215 at approach vector 202.

Figure 2B:
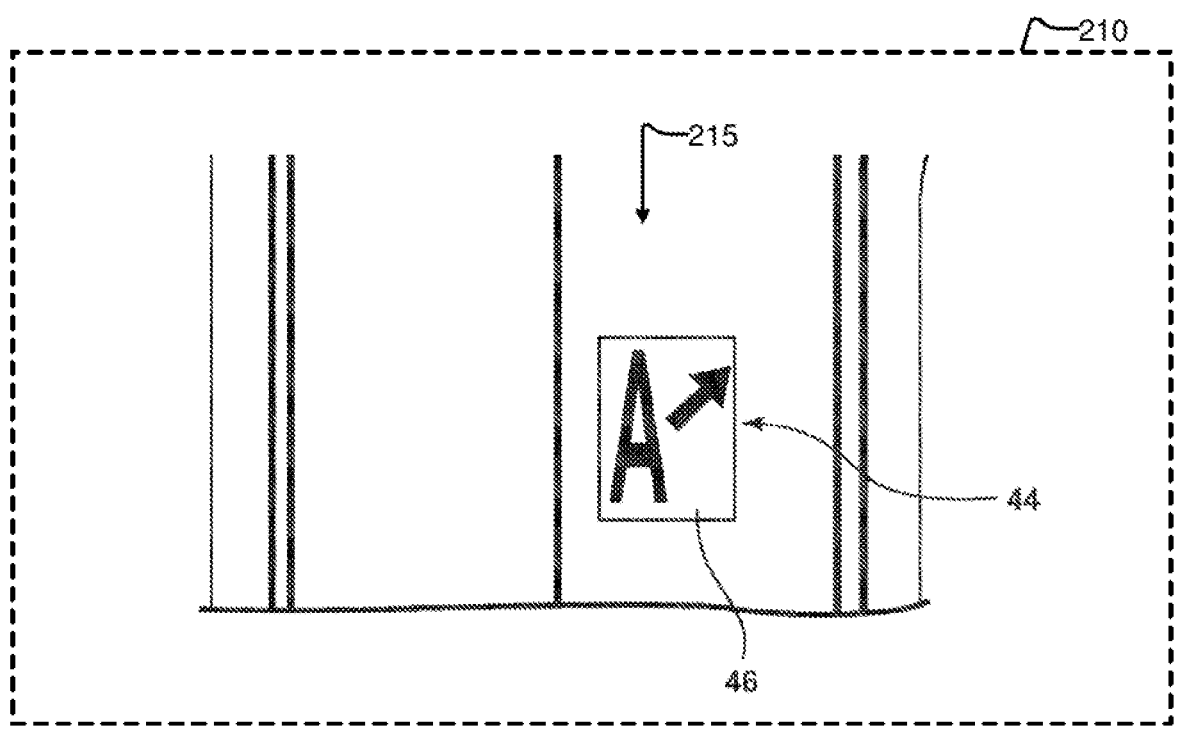
FIG. 2B is a schematic illustration of example sensor data obtained by the aerial vehicle of FIG. 2A.

During the approach, the aerial vehicle 200 may obtain a variety of sensor data. FIG. 2B is a schematic illustration of example sensor data 210 obtained by the aerial vehicle 200. As illustrated, the direct approach vector 202 allows the sensor data 210 to appear relatively undistorted. In this example, a machine vision controller associated with the aerial vehicle 200 can process the sensor data 210 to determine that a direction indicator 46 and position markings 44 are appropriately located relative to the aerial vehicle 200. In some implementations, the machine vision controller may generate one or more displays for a pilot or other operator providing the direction indicator 46, position markings 44, and/or a representation of any other geographic indicator.

The machine vision controller may utilize various image processing and/or machine vision processing techniques to identify objects using image data. Physics-based modeling and/or machine learned models may be used for object detection. Objects may be detected and classified using various image and/or machine vision processing techniques.

Accordingly, the aerial vehicle 200 can safely continue its approach and complete landing maneuvers. However, if the aerial vehicle 200 and associated machine vision controller determine that the approach vector 202 is inappropriate or misaligned, the machine vision controller associated with the aerial vehicle 200 can provide warnings, indications, and other data to a pilot or operator to ensure the pilot is aware of the situational position and approach of the aerial vehicle 200.

Under some circumstances, the warnings may be used to determine that a landing cannot continue due to obstructions, misaligned vectors, incorrect geographical areas, or other misinformation. Accordingly, the aerial vehicle 200 may be equipped to efficiently correct the misinformation, alter a flight plan, and/or avoid a landing to ensure the aerial vehicle 200 lands at a correct geographic location, safely. Under other circumstances, typical machine vision processing of the sensor data 210 may be inappropriate due to a variety of issues, such as weather or approach vectors differing from the thrust vector of an aerial vehicle.

In some implementations, aircraft performance data may be used to selectively trigger alerts or displays that are generated based on the sensor data such as image data. By way of example, the machine vision controller may obtain altitude and/or aircraft configuration data from the performance data and use this information to selectively generate geographic based alerts. By way of example, the machine vision controller may determine from the performance data whether the aircraft is below a certain altitude and/or whether the aircraft landing gear is down. If the performance data indicates that the aircraft is attempting a landing, displays may be generated based on the geographic indicators. For example, runway markers and other identifiers may be displayed if the performance data indicates that the aircraft is landing. If, however, the performance data indicates that the aircraft is not attempting a landing, alerts or displays that would otherwise be generated in response to geographic indicators may not be displayed.

Figure 3A:
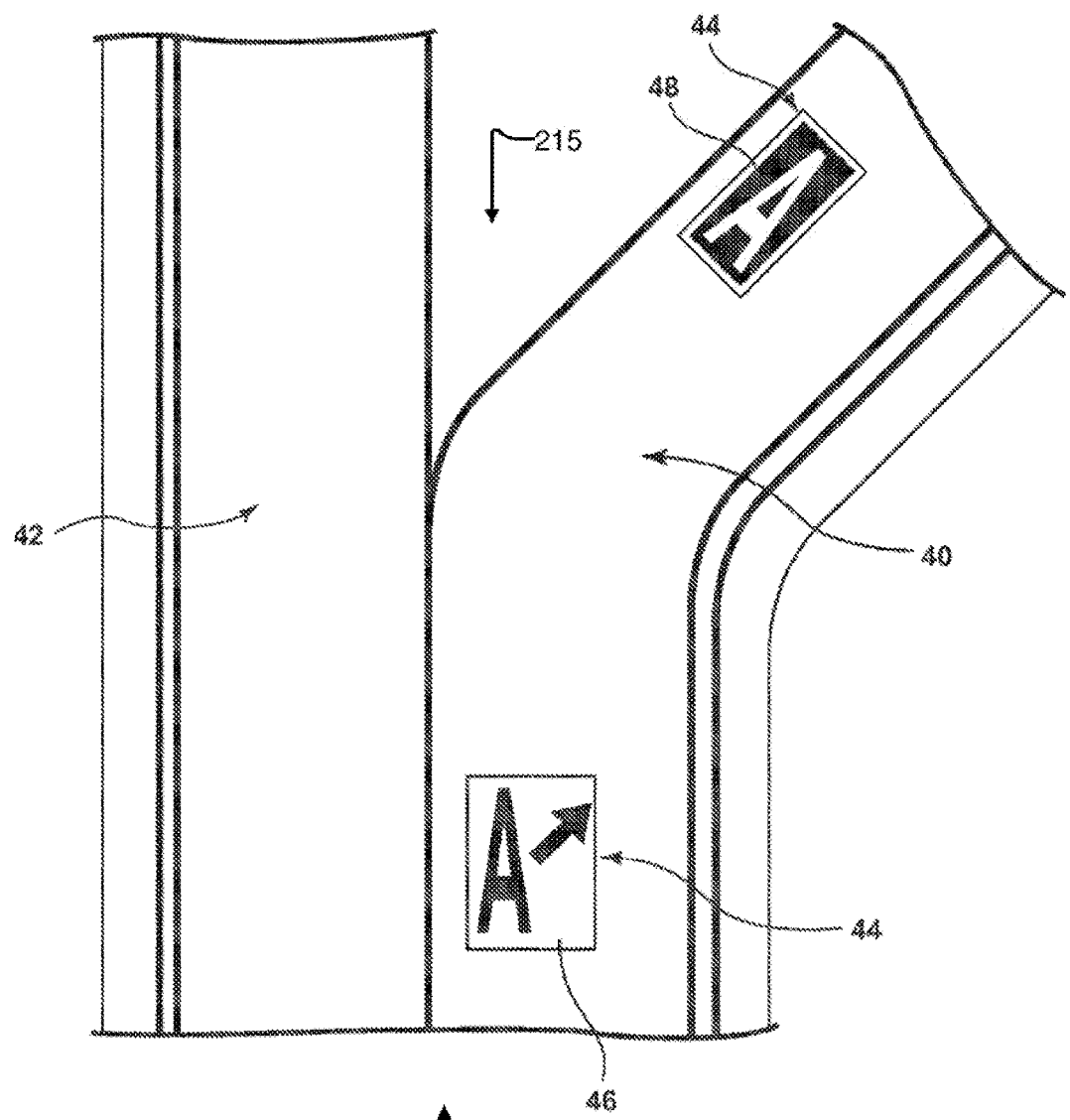
FIG. 3A is a schematic illustration of an additional aerial vehicle approaching a portion of the landing area of FIG. 1.

FIG. 3A is a schematic illustration of aerial vehicle 200 approaching the portion 215 of the landing area of FIG. 1. As illustrated, the aerial vehicle 200 has a thrust vector 302 in an attempt to correct for crosswind 306 that is flowing perpendicular to the portion 215 of the landing area of FIG. 1. Thus, while the thrust vector 302 is generally directed away from the landing area 215, the aerial vehicle 200 is actually on an approach vector 304. Due to the direction of the aerial vehicle being out of perfect alignment with the landing area 215, sensor data obtained by the aerial vehicle 200 may be distorted or difficult to process.

Figure 3B:
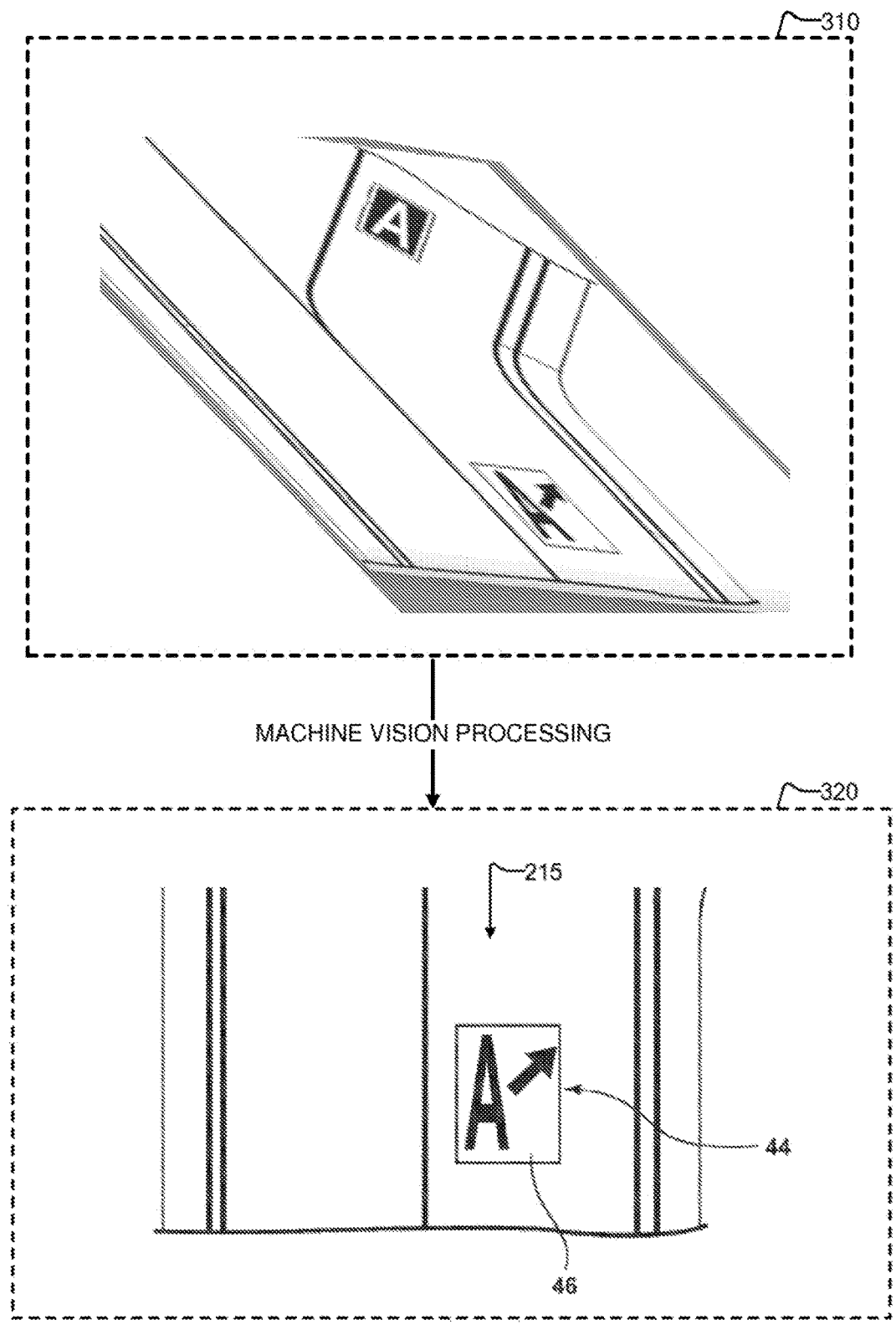
FIG. 3B is a schematic illustration of example sensor data obtained by the aerial vehicle of FIG. 3A.

As an example, FIG. 3B is a schematic illustration of example sensor data 310 obtained by the aerial vehicle 200 of FIG. 3A on thrust vector 302. As shown, due to the thrust vector 302, and therefore the axial alignment of the aerial vehicle 200 not aligning with the portion 215 of the landing area, the sensor data 310 appears to point towards a different landing area as compared to sensor data 210. In this scenario, a machine vision controller associated with the aerial vehicle 200 can process the sensor data 310 to compensate for movement and/or performance data of the aerial vehicle 200. For example, the machine vision controller can determine a crosswind value 306 and performance data including the thrust vector 302. The machine vision controller can also estimate the approach vector 304 based on the crosswind value 306 and the performance data. Thereafter, the machine vision controller can translate the sensor data 310 into 320 based on the approach vector 304. Therefore, the machine vision controller can correct the apparent misalignment or distortion based on the thrust vector 302, approach vector 304, and crosswind 306, resulting in sensor data 320. Sensor data 320 is sufficiently similar to sensor data 210 and allows for successful identification of the portion 215, including all visual markers illustrated thereon. Additionally, under some circumstances, the sensor data 320 can be compared to a map or model of a proximal area near the aerial vehicle 200. The map or model can include a two-dimensional mapping of information with associated height, depth, or other dimensional information, for example, of surrounding buildings and landmarks. Upon comparing, geographic indicators including buildings, landmarks, topographical features, runways, runway markings, and other geographic indicators can be identified to determine that the aerial vehicle 200 is operating or attempting to land in a safe or expected area.

As described above, aerial vehicle 200 may include a machine vision controller configured to process sensor data, identify geographic identifiers in sensor data, compare obtained sensor data to desired sensor data, identify geographic location from sensor data, automatically maneuver the aerial vehicle responsive to sensor data and other data, determine if an approach vector is safe for landing, and/or reduce risk associated with instrumentation-only landings. Furthermore, under some circumstances, the machine vision controller can predict a flight path of the aerial vehicle 200 based on processing the sensor data. Flight path prediction may include an estimated or predicted flight path based on any of a thrust vector, crosswind, axial alignment based on a ground plane reference, instrumentation values, and other aerial vehicle performance data. The machine vision controller may be integrated within the aerial vehicle 200 or may be a remote controller configured to transmit calculated data to the aerial vehicle. The machine vision controller may also be configured to provide warnings, both audial and visual, to operators of the aerial vehicle, to aid in a plurality of aircraft maneuvers. Hereinafter, a detailed description of an example aerial vehicle 200 having an integrated machine vision controller 402 is provided.

Figure 4:
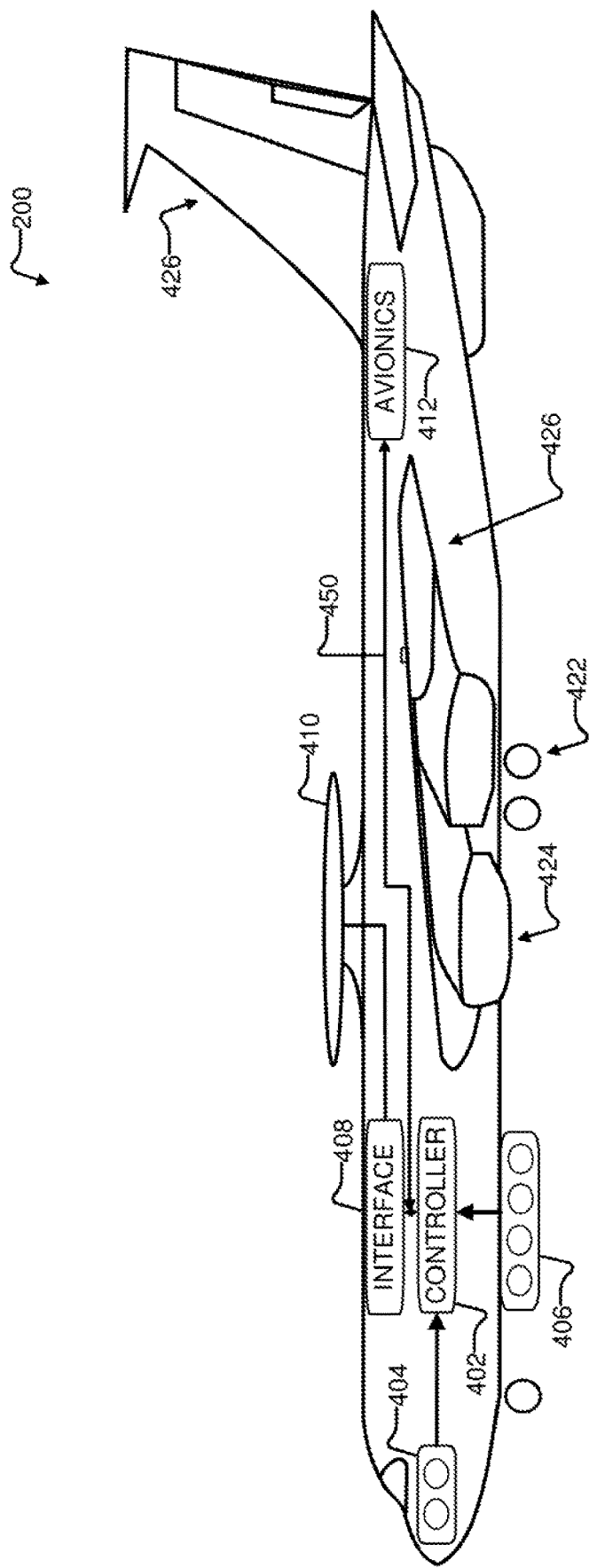
FIG. 4 is a diagram of an example aerial vehicle, according to example embodiments of the present disclosure.

FIG. 4 is a diagram of an example aerial vehicle 200, according to example embodiments of the present disclosure. As illustrated, the aerial vehicle 200 can include a machine vision controller 402 configured for sensor data processing as described herein. The machine vision controller 402 can be a standalone controller, customized controller, or can be a generic computer controller configured to process sensor data as a machine vision processor.

The controller 402 can be configured to obtain sensor data from a first sensor array 404. The sensor array 404 may be an externally mounted sensor array or an internal mounted sensor array. The sensor array 402 can include one or more of optical sensors, camera sensors, acoustic sensors, radar sensors, laser sensors, and/or LIDAR sensors. Optical sensors can include visible light sensors, infrared sensors, and other optical sensors tuned to more or fewer frequencies. For example, optical sensors that can sense and encode infrared frequencies may have better performance characteristics in low-light and inclement weather conditions as compared to typical human sight. Other appropriate sensors may also be included in the sensor array 404, according to any desired implementation of the aerial vehicle 200.

The controller 402 can also be configured to obtain sensor data from a second sensor array 406. The sensor array 406 may be an externally mounted sensor array or an internal mounted sensor array. The sensor array 406 can include one or more of optical sensors, camera sensors, acoustic sensors, radar sensors, laser sensors, and/or LIDAR sensors. Optical sensors can include visible light sensors, infrared sensors, and other optical sensors tuned to more or fewer frequencies. Other appropriate sensors may also be included in the sensor array 406, according to any desired implementation of the aerial vehicle 200.

The controller 402 may be configured to communicate with external processors, controllers, and/or ground equipment and other aircraft through interface 408. The interface 408 may be a standardized communications interface configured to send and receive data via antenna array 410. It is noted that although particularly illustrated as an externally mounted antenna array on the upper surface of the aerial vehicle 200, that any form of antenna array may be applicable.

The controller 402 may also be configured to communicate with avionics system 412 of the aerial vehicle 200 over communications bus 450. For example, the controller 402 may provide appropriate information to avionics system 412 such that landing gear 422 is controlled up/down based on machine vision processing. Furthermore, the controller 402 may provide appropriate information to avionics system 412 such that thrust from engines 424 is controlled based on machine vision processing. Moreover, the controller 402 may provide appropriate information to avionics system 412 such that control surfaces 426 are adjusted for automatic maneuvers such as landing denials, obstacle avoidance, safety maneuvers, and other movement of the aerial vehicle 200.

It should be readily understood that the aerial vehicle 200 may include more or fewer control components than those particularly illustrated. Furthermore, the aerial vehicle 200 may include several components, aspects, and necessary structures not particularly illustrated herein for the sake of brevity, clarity, and concise disclosure of the example embodiments described herein. Hereinafter, operational details of the aerial vehicle 200 are presented with reference to FIG. 5 and FIG. 6.

The controller and avionics system may generally include one or more processor(s) and associated memory configured to perform a variety of computer-implemented functions, such as various methods, steps, calculations and the like disclosed herein. In some examples, the controller and/or avionics system may be programmable logic devices, such as a Field Programmable Gate Array (FPGA), however they may be implemented using any suitable hardware and/or software.

The term processor may generally refer to integrated circuits, and may also refer to a controller, microcontroller, a microcomputer, a programmable logic controller (PLC), an application specific integrated circuit (ASIC), a Field Programmable Gate Array (FPGA), and other programmable circuits. Additionally, the memory described herein may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Any one or a combination of the flight management system and vehicle control system may also include a communications interface. The communications interface can include associated electronic circuitry that is used to send and receive data. More specifically, the communications interface can be used to send and receive data between any of the various systems. Similarly, a communications interface at any one of the systems may be used to communicate with outside components such as another aerial vehicle and/or ground control. A communications interface may be any combination of suitable wired or wireless communications interfaces.

Figure 5:
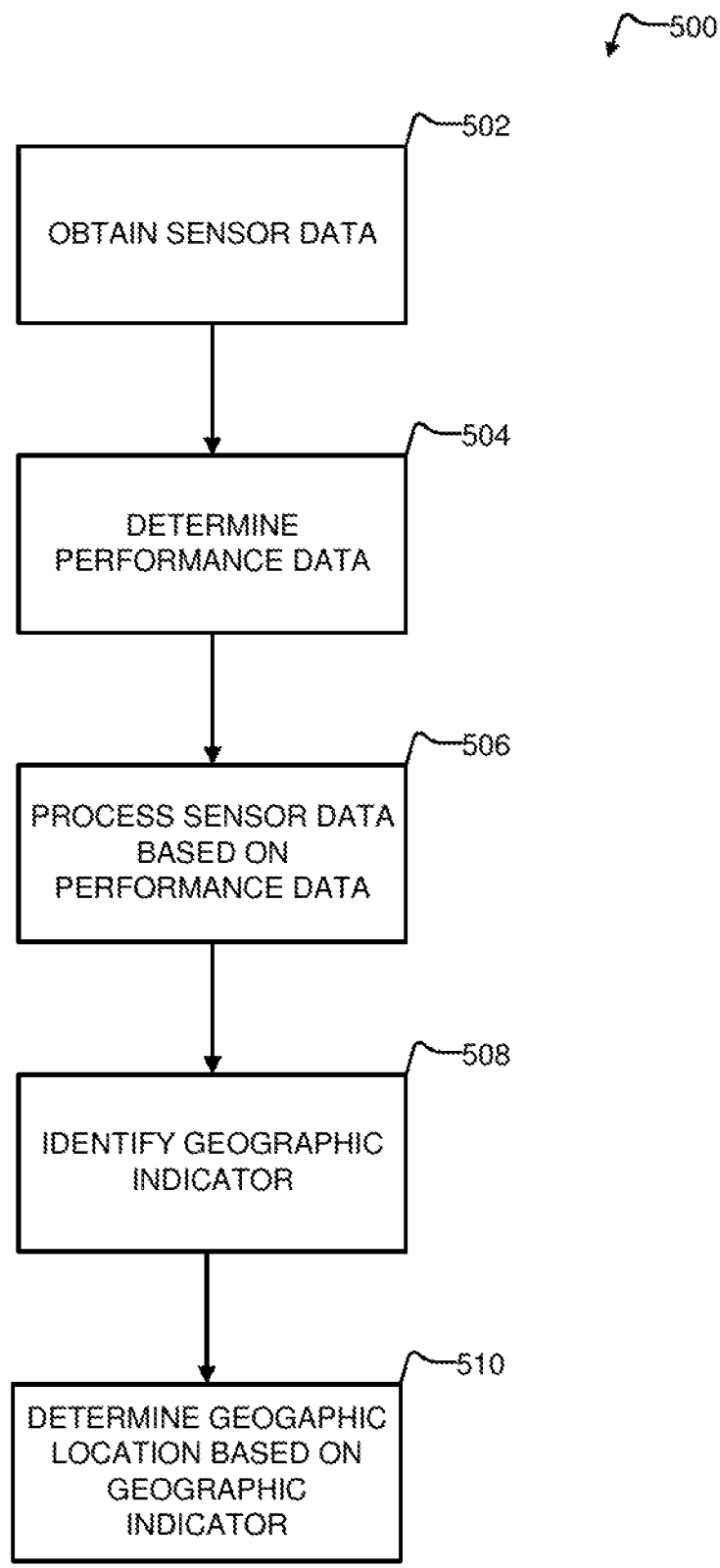
FIG. 5 is a flow diagram of a method of machine vision processing of sensor data of an aerial vehicle, according to example embodiments of the present disclosure.
Figure 6:
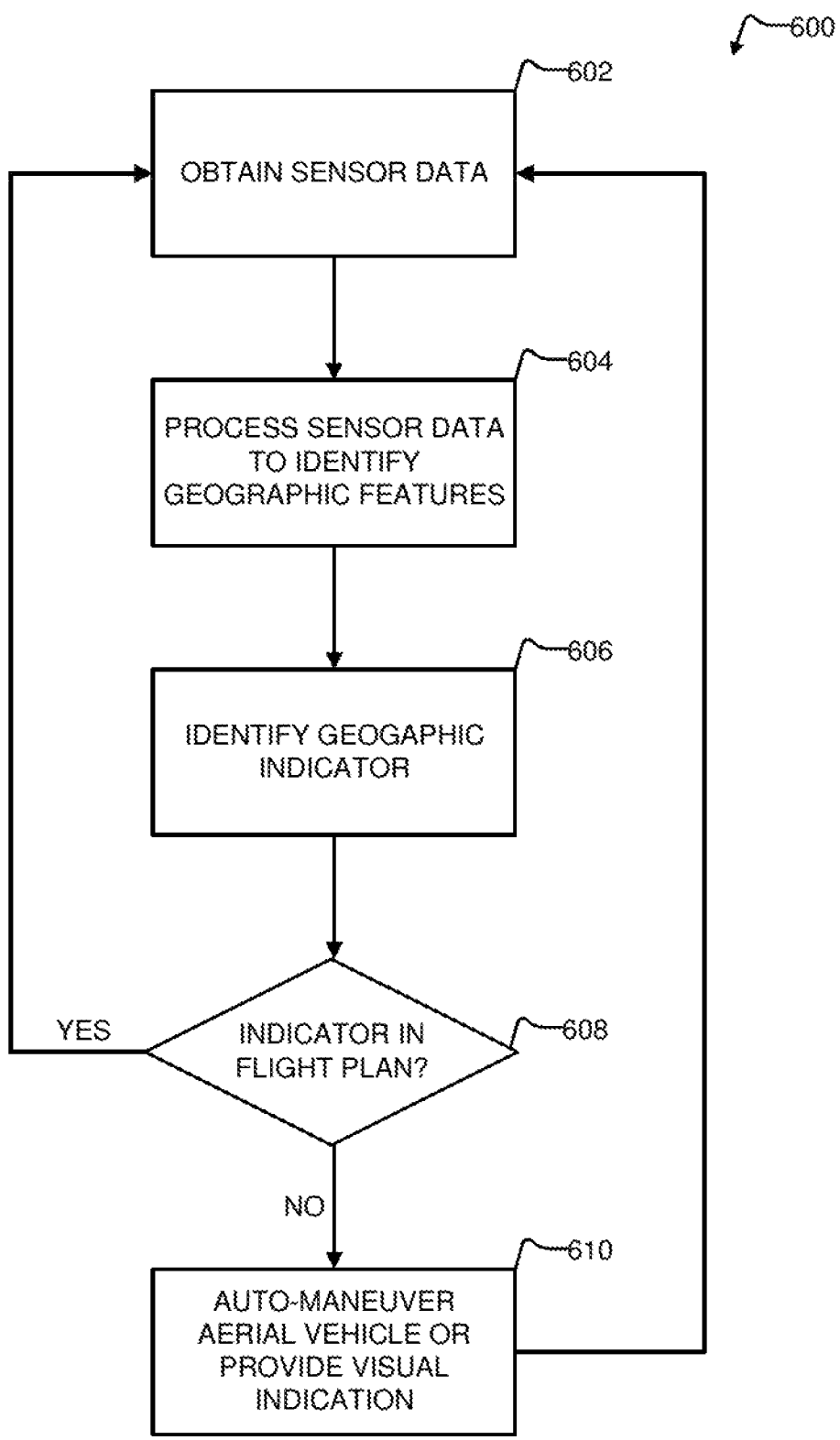
FIG. 6 is a flow diagram of an additional method of machine vision processing of sensor data of an aerial vehicle, according to example embodiments of the present disclosure.

FIG. 5 is a flow diagram of a method 500 of machine vision processing of sensor data of an aerial vehicle, and FIG. 6 is a flow diagram of a method 600 of machine vision processing of sensor data of an aerial vehicle, according to example embodiments of the present subject matter. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

For example, the operations of the methods 500 and 600 are described herein as being implemented, at least in part, by system components such as controller 402, which can comprise a processor, control application, machine vision circuitry, machine vision components and/or machine vision applications. In some configurations, the system components include functionality produced by an application programming interface (API), a compiled program, an interpreted program, a network service, a script, or any other executable set of instructions.

Although the following illustration refers to the components of FIG. 4, it can be appreciated that the operations of the methods 500 and 600 may be also implemented in many other ways. For example, the methods 500 and 600 may be implemented, at least in part, by a processor of a remote controller or a local circuit, including a remote pilot control center for controlling an unmanned aerial vehicle. In addition, one or more of the operations of the methods 500 and 600 may alternatively or additionally be implemented, at least in part, by a chipset working alone or in conjunction with software modules on board the aerial vehicle 200. Any service, circuit or application suitable for providing the techniques disclosed herein can be used in operations described herein, either remote to, onboard, or a combination thereof with respect to the aerial vehicle 200.

As shown in FIG. 5, the method 500 includes obtaining sensor data from a sensor array 404 or 406, at block 502. The sensor data can include, for example, optical data or radar data obtained from at least one sensor of the sensor arrays 404 and 406. Optical sensor data can also be obtained, and can include stereoscopic images, still images, or video recorded from an optical sensor of the sensor arrays 404 and 406. Other sensor data can include altitude, distance from ground, and other suitable data.

The method 500 further includes obtaining performance data from avionics 412 and/or sensor array 404 or 406, at block 504. The performance data can include, for example, a calculated approach vector, a thrust vector, rate of ascent, rate of descent, angle relative to a ground plane, and other suitable performance data. In at least one example, the performance data is obtained from sensors and/or avionics system 412. The performance data may be obtained directly from sensors and/or avionics system 412 or may be derived from sensor data obtained from the sensors. According to other examples, the performance data is input manually. Still according to other examples, the performance data may be based on positions of control surfaces and engine status provided by avionics 412 or other components of the aerial vehicle 200.

The method 500 further includes processing the sensor data based on the performance data, at block 506. In some examples, block 506 may include processing the sensor data to compensate for the performance data. In some examples, the sensor data is processed with a machine vision controller using machine vision and/or image processing techniques. In some examples, the sensor data is processed to compensate for movement of the aerial vehicle as determined from the performance data. According to at least one example, the processing can include processing a distorted image using machine vision to create an image with reduced, minimized, or corrected distortion. The corrected image may include legible indicia and other corrections. The processing can also include processing to compensate for movement, such as by, for example, correcting perspectives of buildings, landmarks, and other features. Additionally, the processing can include isolating landmarks, indicia, geographic features, and other optical data for further identification in subsequent or parallel machine vision processing. For example, and as illustrated in FIG. 3B, the sensor data 310 can be processed to create corrected sensor data 320. The machine vision controller 402 may process the sensor data 310 to correct apparent distortion, misalignments, and other issues using the performance data and any other available data.

The method 500 further includes identifying a geographic indicator in the processed sensor data, at block 508. For example, the machine vision controller 402 can interpret the processed sensor data to identify visual indicators such as those illustrated in FIG. 1. Other geographic indicators can include, for example, a number of buildings surrounding an landing area, height of buildings surrounding a landing area, surrounding higher elevation (such as mountains or natural features), surrounding lower elevation (such as crevasses or natural features), and other geographic indicators. Still further, geographic indicators can include GPS data, rivers, bodies of water, physical or virtual beacons, temporary structures such as towers/cones, and other indicators.

The method 500 further includes determining a geographic location of the aerial vehicle based on the identified geographic indicator, at block 510. The machine vision controller 402 can compare the identified geographic indicators to a predetermined set of geographic indicators, such as expected geographic features or a map or model of expected features, to determine a location of the aerial vehicle 200. For example, the machine vision controller 402 can determine if an expected control tower at an airport is detectable in the sensor data. The machine vision controller 402 can also determine if airport buildings are detectable in the sensor data. Thus, using all available sensor data, the machine vision controller 402 can compare the sensor data to expected data from a flight plan to determine the geographic location.

In some example aspects, a model of expected features may include depth or height information. Accordingly, in some examples the machine vision controller 402 is configured to determine a height of geographic features in a proximal location to the aerial vehicle based on processing the sensor data. For example, the machine vision controller 402 can access one or more images obtained by one or more image sensors to identify one or more geographic features. A depth camera, radar/LIDAR, and/or other sensors may be used to determine three-dimensional or height information associated with the geographic features. The machine vision controller 402 can access a database of predetermined geographic indicators associated with a geographic location such as known landing locations. The database can include height or other depth information associated with the predetermined geographic indicators. The machine vision controller 402 can compare the database, including the height of geographic indicators, in order to identify geographic features based on the image data. The machine vision controller 402 can determine a corresponding geographic location to a geographic feature based on comparing the height of geographic features from the sensor data to height information in the database.

Utilizing the determined geographic location, a pilot or operator of the aerial vehicle 200 can decide whether to safely land the aerial vehicle, alter a flight plan, or otherwise control the aerial vehicle. It is contemplated that visual indicators such as warnings and audio indicators such as alarms can also be used. For example, an indicator such as a visual indicator that landing can be performed safely or not safely can be provided. In some implementations, the indicator may identify a runway or other feature with which the aerial vehicle is aligned for landing. In some implementations, an indicator may include a warning that the aerial vehicle is misaligned. For example, the system may compare the geographic indicator with flight plan data and provide a warning if the geographic indicator is not associated with the flight plan data. In some examples, a warning can be provided if geographic indicators include obstructions identified in machine vision processing. Furthermore, visual and audio indicators can include positive indications that a landing pattern is deemed safe by the machine vision controller 402 such that the pilot or operator can concentrate on other maneuvers to complete a safe landing.

Additionally, the pilot or operator of the aerial vehicle 200 may be remote, and the aerial vehicle may be an unmanned aerial vehicle, such that alerts, indicators, and geographic location are provided to the pilot or operator in a remote location. In these circumstances, the identified geographic location may be used to automatically maneuver the aircraft, as described below with reference to FIG. 6. It is noted, however, that a manned aircraft may be automatically maneuvered in accordance with embodiments of the disclosed technology. FIG. 6 is a flow diagram of an additional method 600 of machine vision processing of sensor data of an aerial vehicle, according to example embodiments of the present disclosure.

As shown in FIG. 6, the method 600 includes obtaining sensor data from a sensor array 404 or 406, at block 602. The sensor data may be substantially similar to the sensor data described above. The method 600 further includes processing the obtained sensor data to identify geographic features in the area proximal to the aerial vehicle, at block 604. The processing may include correcting distortion, compensating for movement, identifying obstacles, and/or matching flight plans to expected geographic features.

According to at least one example, the processing can include processing a distorted image, or distorted sensor data, using machine vision to create a processed image or processed sensor data with reduced, minimized, or corrected distortion. The processed image may include legible indicia and other corrections. The processing can also include processing to compensate for movement, such as by, for example, correcting perspectives of buildings, landmarks, and other features. Additionally, the processing can include isolating landmarks, indicia, geographic features, and other optical data for further identification in subsequent or parallel machine vision processing.

In some examples, processing the sensor data includes processing image data based on aircraft misalignment. For example, performance data such as crosswind and other information can be used to determine a misalignment of an aircraft approach vector with the image data obtained from one or more sensors. The performance data can be used to translate or otherwise determine modified sensor data to correct or compensate for the misalignment. For example, when approaching a landing area the image data may identify a first runway according to a first runway marker for example. However, the performance data may indicate that the aerial vehicle is landing in a strong crosswind. This and/or other performance data may indicate that the aerial vehicle is misaligned with its approach vector. This information may be used to modify the sensor data to indicate the appropriate information corresponding with the approach. As a result, the machine vision controller 402 may determine that the aircraft is actually approaching a second runway adjacent to the first runway. The determination may be made even though the image data corresponds to the first runway.

The method 600 further includes identifying a geographic indicator in the processed sensor data, at block 606. The geographic indicator may include a desired indicator or an obstacle. For example, the geographic indicator may include a landmark, body of water, airport, particular runway at an airport, or other geographic indicator, including all geographic indicators described herein. Using machine vision processing and/or a machine vision algorithm, the geographic indicator can be identified in the processed sensor data. Additionally, the machine vision controller can identify obstacles at block 606. For example, an obstacle can include any object or indicia that is not expected in a landing area. Obstacles can include temporary or permanent obstacles. Obstacles can further include indicia purposefully marked (e.g., such as an 'X' or 'NOT SAFE FOR LANDING') to allow pilots and operators to identify that a landing area is not to be used for landings. In some examples, the machine vision controller 402 can immediately indicate the presence of an obstacle. In some examples, the machine vision controller 402 can delay an alert if an obstacle is a moving obstacle, such as a landing assist vehicle, that will be clear of an active landing area prior to landing by the aerial vehicle. Furthermore, the machine vision controller 402 can issues multiple forms of soft alerts and high alerts if moving obstacles are deemed hazardous or are not moving as expected, or are not following an expected pattern. Processing and identifying obstacles can be aided through use of radar/LIDAR information, and other suitable data available from sensors.

The method 600 further includes determining if the identified geographic indicator is in a flight plan associated with the aerial vehicle, at block 608. For example, the machine vision controller 402 may process the sensor data and compare the same to expected sensor data of the flight plan. The expected sensor data may include maps, models, renderings, and/or other suitable data for machine vision processing and comparison to the processed sensor data. The expected sensor data can include, for example, a two-dimensional map having associated height or dimensional information. Machine vision processing can facilitate comparisons between the processed sensor data and this expected sensor data to determine if a match exists or if the geographic indicator exists within the flight plan.

The method 600 further includes automatically maneuvering the aerial vehicle, or providing visual indication, based on the determination, at block 610. For example, the aerial vehicle, based on the determination, may be automatically maneuvered to avoid a landing or continue flying. Other automatic maneuvers including obstacle avoidance, fast touchdown and takeoff, and similar maneuvers based on geographical indicators are also applicable. The machine vision controller 402 can also provide video or audio indications, as described above.

It should be appreciated that the operational blocks of method 500 and method 600 may not exhaustively describe all aspects of aerial vehicle control. These operational blocks may be a simplified operational flow chart describing only partial aspects of aerial vehicle control, and should not be construed of illustrating all possible control scenarios.

Figure 7:
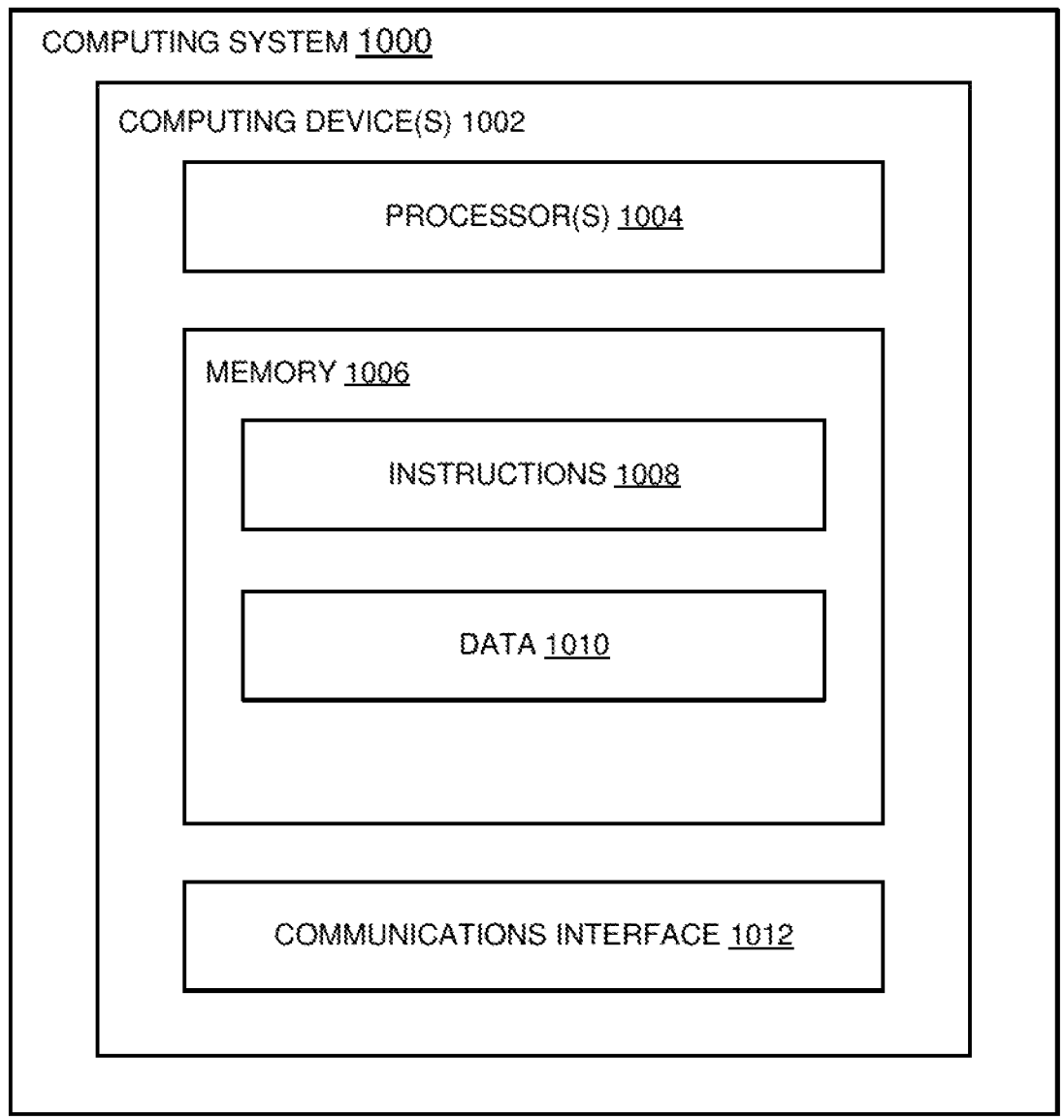
FIG. 7 is a block diagram of an example computing system that can be used to implement methods and systems according to example embodiments of the present disclosure.

FIG. 7 depicts a block diagram of an example computing system 1000 that can be used to implement methods and systems according to example embodiments of the present disclosure. Computing system 1000 may be used to implement a machine vision controller 402 as described herein. It will be appreciated, however, that computing system 1000 is one example of a suitable computing system for implementing the machine vision controller 402 and other computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for machine vision processing of sensor data, identifying geographic features and indicators, locating an aerial vehicle based on sensor data, and other operations such as those described above with reference to methods 500 and 600, and/or any other operations or functions of the one or more computing device(s) 1002.

The memory device(s) 1006 can further store data 1010 that can be accessed by the processors 1004. For example, the data 1010 can include sensor data such as engine parameters, model data, logic data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aerial vehicle, comprising:
   a plurality of sensors mounted thereon;
   an avionics system configured to operate at least a portion of the aerial vehicle; and
   a machine vision controller in operative communication with the avionics system and the plurality of sensors, the machine vision controller configured to perform a method, the method comprising:
      obtaining sensor data from at least one sensor of the plurality of sensors, wherein the sensor data is associated with a proximal location of the aerial vehicle and the proximal location is within sensor range of the aerial vehicle;
      determining performance data associated with the aerial vehicle;
      processing the sensor data based on the performance data to compensate for movement of the unmanned aerial vehicle;
      identifying at least one geographic indicator based on processing the sensor data, wherein identifying the at least one geographical indicator comprises comparing the sensor data to a predetermined set of sensor data, identifying an obstacle associated with the sensor data based on the comparing, and triggering an alert indicating identification of the obstacle;
      determining whether the obstacle is moving; and
      determining a geographic location of the aerial vehicle based on the at least one geographic indicator, wherein when the obstacle is determined to be moving, delaying the triggering of the alert.

2. The aerial vehicle of claim 1, wherein processing the sensor data comprises:
   determining a height of a plurality of geographic features in the proximal location;
      comparing the plurality of geographic features with a database identifying a plurality of predetermined geographic indicators associated with known landing locations, the database including a height identifier for each of the plurality of predetermined geographic indicators;
   wherein determining the geographic location of the aerial vehicle comprises identifying the geographic location of the aerial vehicle based at least in part on the height identifier for the at least one geographic indicator and the height of a corresponding geographic feature.

3. The aerial vehicle of claim 1, wherein the sensor data is based on still images or video recording by an image capture device located on the aerial vehicle.

4. The aerial vehicle of claim 1, wherein the sensor data is based on remote sensing associated with a laser, Light Detection and Ranging (LIDAR), or radar.

5. The aerial vehicle of claim 1, wherein the processing of the sensor data comprises processing the sensor data to reduce distortion based on the performance data associated with the aerial vehicle.

6. The aerial vehicle of claim 5, wherein processing the sensor data to reduce distortion comprises:
   determining a crosswind value;
   estimating an approach vector based on the crosswind value and the performance data; and
   translating the sensor data based on the approach vector.

7. The aerial vehicle of claim 1, wherein identifying the at least one geographical indicator comprises:
   comparing the sensor data to a model of the proximal area; and
   matching a first geographic indicator associated with the sensor data to at least one second geographical indicator associated with the model of the proximal area.

8. The aerial vehicle of claim 1, wherein identifying the at least one geographical indicator comprises:
   comparing the sensor data to a predetermined set of sensor data; and
   identifying an obstacle associated with the sensor data based on the comparing.

9. The aerial vehicle of claim 1, wherein the method further comprises:
   determining that the geographic location of the aerial vehicle is absent from a flight plan of the aerial vehicle; and
   instructing the avionics system to perform a corrective maneuver in response to the determining that the geographic location of the aerial vehicle is absent.

10. The aerial vehicle of claim 1, wherein the method further comprises:
    determining, based on the performance data, whether the aerial vehicle is attempting a landing;
    determining whether the at least one geographic indicator is associated with an appropriate landing area for the aerial vehicle; and
    in response to determining that the aerial vehicle is attempting a landing and that the at least one geographic indicator is associated with an appropriate landing area, providing a visual indication that the geographic location corresponds to an appropriate landing area.

11. The aerial vehicle of claim 10, wherein the method further comprises:
    in response to determining that the aerial vehicle is not attempting a landing and that the at least one geographic indicator is associated with an appropriate landing area, determining that the visual indication should not be displayed.

12. The aerial vehicle of claim 1, wherein identifying the at least one geographical indicator comprises:
    comparing the sensor data to a predetermined set of sensor data;

identifying an obstacle associated with the sensor data based on the comparing; and triggering an alert indicating identification of the obstacle.

13. The aerial vehicle of claim 12, further comprising:

when the obstacle is determined to be moving, the alert triggered is one of a soft alert and a high alert depending on whether the obstacle is deemed hazardous, not moving as expected, or not following an expected pattern.

14. The aerial vehicle of claim 1, wherein the at least one geographic indicator is a building surrounding a landing area.

15. The aerial vehicle of claim 1, wherein the at least one geographic indicator is as natural feature.

16. The aerial vehicle of claim 1, wherein the performance data further includes at least one of a rate of ascent and a rate of descent.

17. A method of locating an aerial vehicle relative to a proximal location, the method comprising:

obtaining sensor data from one or more optical sensors mounted on the aerial vehicle, wherein the sensor data is associated with the proximal location and the proximal location is within sensor range of the aerial vehicle;

determining performance data from one or more additional sensors mounted on the aerial vehicle;

determining, based on the performance data, whether the aerial vehicle is attempting a landing;

processing the sensor data based on the performance data to compensate for movement of the unmanned aerial vehicle;

identifying at least one geographic indicator based on processing the sensor data;

determining whether the at least one geographic indicator is associated with an appropriate landing area for the aerial vehicle;

determining a geographic location of the aerial vehicle based on the at least one geographic indicator; and in response to determining that the aerial vehicle is attempting a landing and that the at least one geographic indicator is associated with an appropriate landing area, providing a visual indication that the geographic location corresponds to an appropriate landing area.

18. The method of claim 17, wherein the method further comprises:

in response to determining that the aerial vehicle is not attempting a landing and that the at least one geographic indicator is associated with an appropriate landing area, determining that the visual indication should not be displayed.

19. An aerial vehicle, comprising:

a plurality of sensors mounted thereon;

an avionics system configured to operate at least a portion of the aerial vehicle; and a machine vision controller in operative communication with the avionics system and the plurality of sensors, the machine vision controller configured to perform a method, the method comprising:

obtaining sensor data from at least one sensor of the plurality of sensors, wherein the sensor data is associated with a proximal location of the aerial vehicle and the proximal location is within sensor range of the aerial vehicle;

determining performance data associated with the aerial vehicle;

processing the sensor data based on the performance data to compensate for movement of the unmanned aerial vehicle, wherein the processing comprises:

determining a crosswind value;

estimating an approach vector based on the crosswind value and the performance data; and translating the sensor data based on the approach vector;

identifying at least one geographic indicator based on processing the sensor data; and determining a geographic location of the aerial vehicle based on the at least one geographic indicator.

* * * * *